US012026416B2

(12) United States Patent
Kunimoto (10) Patent No.: US 12,026,416 B2
(45) Date of Patent: Jul. 2, 2024

(54) NON-TRANSITORY COMPUTER-READABLE MEDIUM, INFORMATION PROCESSING DEVICE, AND MANAGEMENT METHOD

(71) Applicant: BROTHER KOGYO KABUSHIKI KAISHA, Nagoya (JP)

(72) Inventor: Shintaro Kunimoto, Inazawa (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/055,349

(22) Filed: Nov. 14, 2022

(65) Prior Publication Data

US 2023/0168852 A1 Jun. 1, 2023

(30) Foreign Application Priority Data

Nov. 30, 2021 (JP) .................................. 2021-194664

(51) Int. Cl.
*G06F 3/12* (2006.01)
(52) U.S. Cl.
CPC .......... *G06F 3/1288* (2013.01); *G06F 3/1203* (2013.01); *G06F 3/1204* (2013.01)
(58) Field of Classification Search
None
See application file for complete search history.

(56) References Cited

U.S. PATENT DOCUMENTS

| 11,567,716 | B2* | 1/2023 | Kawasaki | G06F 3/1208 |
| 2004/0190057 | A1* | 9/2004 | Takahashi | G06F 3/1205 |
| | | | | 358/1.15 |
| 2017/0322752 | A1 | 11/2017 | Miura | |

FOREIGN PATENT DOCUMENTS

| JP | 2017-27182 A | 2/2017 |
| JP | 2019-79118 A | 5/2019 |

* cited by examiner

*Primary Examiner* — Darryl V Dottin
(74) *Attorney, Agent, or Firm* — KENEALY VAIDYA LLP (57) ABSTRACT

A non-transitory computer-readable medium storing a management program used in a management system managing terminal devices, the management system including a management device managing the terminal devices, information processing devices performing data communication with the terminal devices, and a storage device performing data communication with the management device and the information processing devices, the management program, when executed by a computer of the information processing device, causes the information processing device to perform: registering, in the storage device, device registration information including: device identification information identifying a connected terminal device that is the terminal device communicably connected to the information processing device; device setting information related to device setting of the connected terminal device; and application date information indicating an application date when the device setting is applied to the connected terminal device.

9 Claims, 9 Drawing Sheets

| | 8/1 | 8/2 | 8/3 | 8/4 |
|---|---|---|---|---|
| MOBILE TERMINAL 3a | ● | | DISCARD | |
| MOBILE TERMINAL 3b | | ●○ | | |

| | 8/1 | 8/2 | 8/3 | 8/4 |
|---|---|---|---|---|
| MOBILE TERMINAL 3a | ● | | ○ | |
| MOBILE TERMINAL 3b | | ● | | ○ |

NON-TRANSITORY COMPUTER-READABLE MEDIUM, INFORMATION PROCESSING DEVICE, AND MANAGEMENT METHOD

REFERENCE TO RELATED APPLICATIONS

This application claims priority from Japanese Patent Application No. 2021-194664 filed on Nov. 30, 2021. The entire content of the priority application is incorporated herein by reference.

BACKGROUND ART

A related art discloses a mobile terminal capable of performing data communication with an external server and a printer downloads firmware from the external server and installs the firmware in the printer.

DESCRIPTION

As described above, in an information processing device configured to relay data between a server and a terminal device (for example, a printer), it is preferable to reduce the amount of data communication.

Illustrative aspects of the present disclosure reduce the amount of data communication of the information processing device.

One illustrative aspect of the present disclosure relates to non-transitory computer-readable medium storing a management program used in a management system that manages a plurality of terminal devices, the management program, when executed by a computer of in the information processing device, causes the information processing device to perform registering device registration information.

The management system includes a management device configured to manage the plurality of terminal devices, a plurality of information processing devices configured to perform data communication with the plurality of terminal devices, and a storage device configured to perform data communication with the management device and the plurality of information processing devices.

The registering of the device registration information includes registering the device information in the storage device, the device registration information including: device identification information identifying a connected terminal device that is the terminal device communicably connected to the information processing device such that the data communication is possible; device setting information related to device setting of the connected terminal device; and application date information indicating an application date when the device setting is applied to the connected terminal device.

The management program of the present disclosure configured in this way can reduce the occurrence of a situation in which the device registration information of the application date earlier than the date indicated by the application date information is unnecessarily registered in the storage device, based on the application date information included in the device registration information already registered in the storage device, and can reduce the amount of data communication between the storage device and the information processing device.

Another illustrative aspect of the present disclosure relates to an information processing device used in a management system that manages a plurality of terminal devices, the information processing device includes a controller configured to register device registration information in the storage device.

The information processing device of the present disclosure is a device controlled by the management program of the present disclosure and the same effect as that of the management program of the present disclosure can be obtained.

Still another illustrative aspect of the present disclosure relates to a management method executed by an information processing device in a management system that manages a plurality of terminal devices, the management method including registering device registration information in a storage device, in which the device registration information includes device identification information, device setting information, and application date information.

The management method of the present disclosure is a method executed by the management program of the present disclosure, and by executing the method, the same effect as that of the management program of the present disclosure can be obtained.

FIGS. 2A and 2B are block diagrams, in which

FIGS. 3A and 3B are block diagrams, in which

FIRST ILLUSTRATIVE EMBODIMENT

A first illustrative embodiment of the present disclosure will be described below together with the drawings.

(1) Overall Configuration

Figure 1:
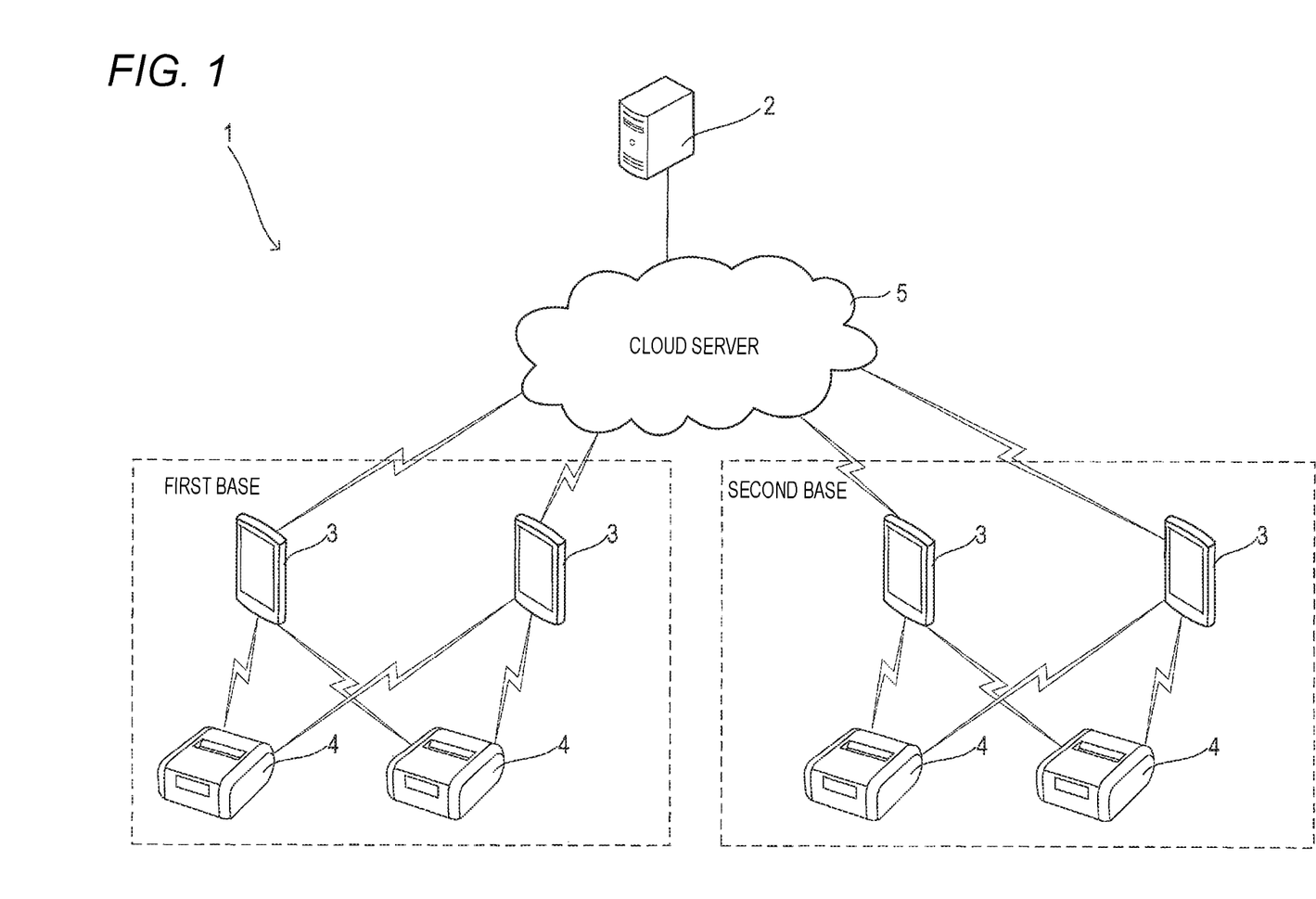
FIG. 1 is a diagram showing a configuration of a management system.

As shown in FIG. 1, a management system 1 of the present illustrative embodiment is a network system, which is configured such that a management device 2 manages a plurality of printers 4 located at a plurality of bases via a plurality of mobile terminals 3 and a cloud server 5.

A plurality of mobile terminals 3 located at a first base and a plurality of printers 4 located at the first base are configured to be able to communicate with each other by short-range wireless communication in a method compliant with the Bluetooth standard or wired communication using USB. "USB" is an abbreviation for "universal serial bus." Bluetooth is a registered trademark of Bluetooth SIG, Inc.

Similarly, a plurality of mobile terminals 3 located at a second base and a plurality of printers 4 located at the second base are configured to be able to communicate with each other by short-range wireless communication in a method compliant with the Bluetooth standard or wired communication using USB.

The management device 2 and the plurality of mobile terminals 3 are configured to be able to communicate with the cloud server 5 via a wide area network.

In the management system 1 of the present illustrative embodiment, for example, the management device 2 can collect information from the plurality of printers 4, and the management device 2 can change the settings of the plurality of printers 4.

(2) Device Configuration

Figure 2A:
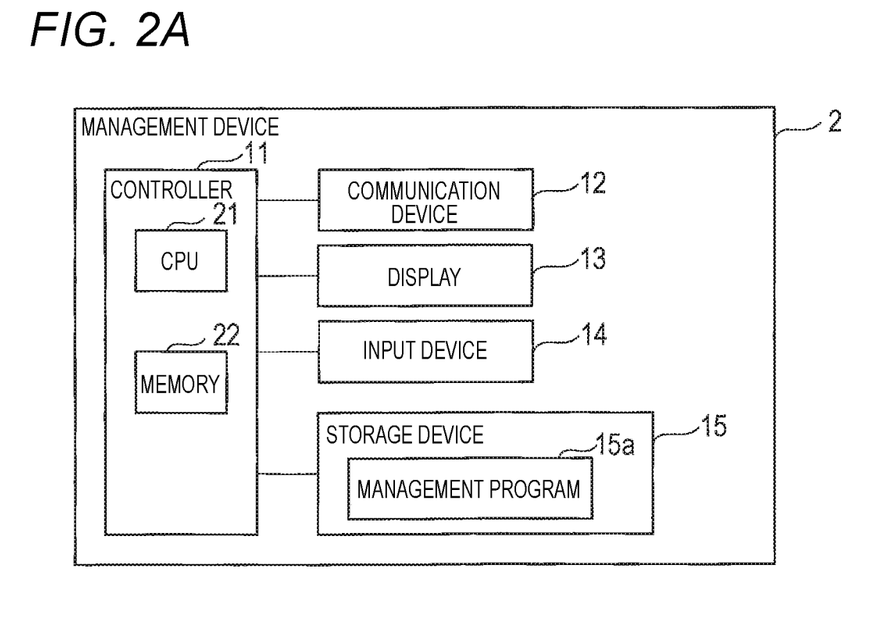
FIG. 2A is a block diagram showing a configuration of a management device.

The management device 2 is a personal computer in the present illustrative embodiment and includes a controller 11, a communication device 12, a display 13, an input device 14, and a storage device 15, as shown in FIG. 2A. The controller 11 includes a CPU 21 and a memory 22. "CPU" is an abbreviation for "central processing unit". The CPU 21 as a processor executes a process according to a computer program stored in the storage device 15. The memory 22 is used as a work memory when the above process is executed.

The storage device 15 includes storage such as a solid state drive and a hard disk drive. The storage device 15 stores various computer programs and data. A management program 15*a* is stored in the storage device 15. The management program 15*a* is a computer program for causing the CPU 21 to implement the management function to be implemented by the management device 2.

The communication device 12 performs data communication with the cloud server 5 via a wide area network. The display 13 includes a display device (not shown) and displays various images on the display device. The input device 14 outputs input operation information for identifying the input operation performed by the user (that is, the administrator) of the management device 2 via a keyboard and a mouse.

Figure 2B:
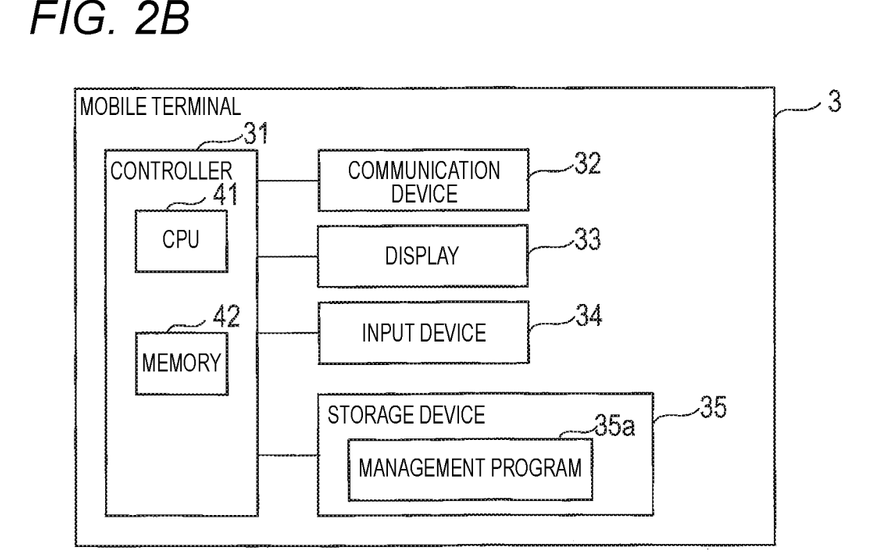
FIG. 2B is a block diagram showing a configuration of a mobile terminal.

The mobile terminal 3 is assigned to each worker who performs work using the printer 4 and is carried by the worker. The mobile terminal 3 includes a controller 31, a communication device 32, a display 33, an input device 34, and a storage device 35, as shown in FIG. 2B. The controller 31 includes a CPU 41 and a memory 42. The CPU 41 as a processor executes a process according to a computer program stored in the storage device 35. The memory 42 is used as a work memory when the above process is executed.

The storage device 35 includes storage such as a solid state drive and a hard disk drive. The storage device 35 stores various computer programs and data. A management program 35*a* is stored in the storage device 35. The management program 35*a* is a computer program for causing the CPU 41 to implement the management function to be implemented by the mobile terminal 3.

The communication device 32 performs data communication with the cloud server 5 via a wide area network. The communication device 32 performs data communication with the printer 4 by short-range wireless communication in a method compliant with the Bluetooth standard or wired communication using USB.

The display 33 includes a display device (not shown) and displays various images on the display device. The input device 34 includes a touch panel installed on the display screen of the display 33 and a switch installed around the display screen of the display 33. The input device 34 outputs the input operation information for identifying the input operation performed by the worker via the touch panel and the switch.

Figure 3A:
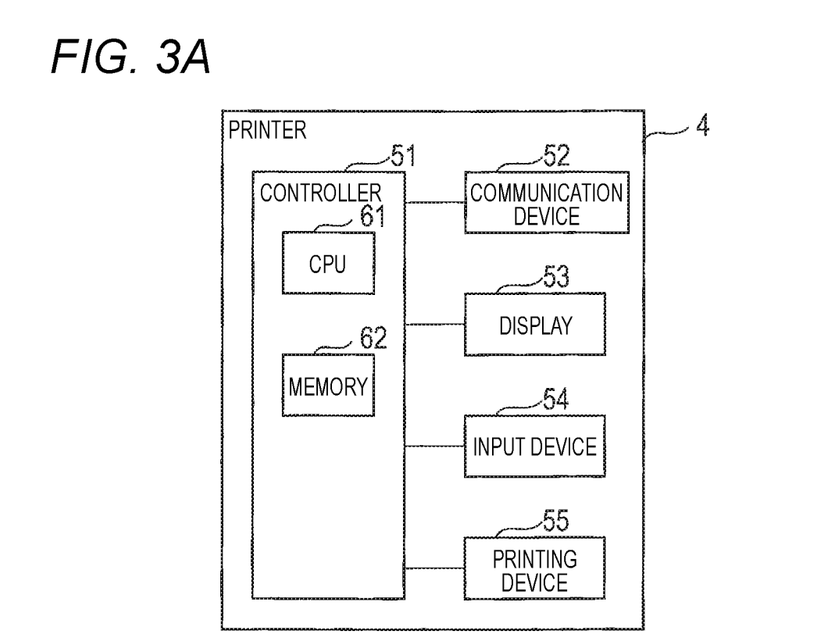
FIG. 3A is a block diagram showing a configuration of a printer.

The printer 4 is a small and lightweight mobile printer that can be carried by the worker. As shown in FIG. 3A, the printer 4 includes a controller 51, a communication device 52, a display 53, an input device 54, and a printing device 55.

The controller 51 includes a CPU 61 and a memory 62. The CPU 61 executes a program stored in the memory 62, whereby various functions of the printer 4 are implemented.

The communication device 52 performs data communication with the mobile terminal 3 by short-range wireless communication in a method compliant with the Bluetooth standard or wired communication using USB.

The display 53 includes a display device (not shown) and displays various images on the display device. The input device 54 includes a switch installed around the display screen of the display 53. The input device 54 outputs input operation information for identifying the input operation that has been performed by the worker via the switch.

The printing device 55 is provided with a thermal printing mechanism and can print an image on thermal roll paper. The printing device 55 may be configured to be printable on cut paper or may be configured to be printable by a well-known recording method (for example, an inkjet method) other than the thermal method.

Figure 3B:
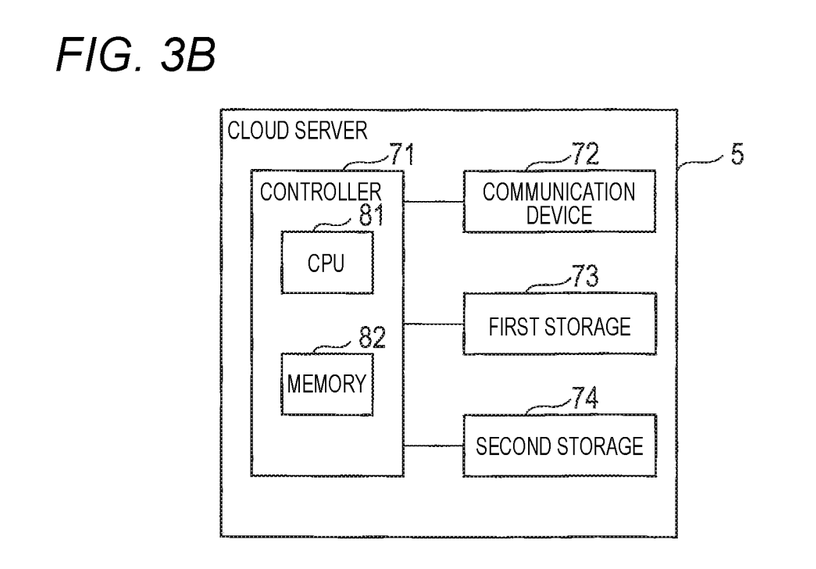
FIG. 3B is a block diagram showing a configuration of a cloud server.

The cloud server 5 includes a controller 71, a communication device 72, a first storage 73, and a second storage 74, as shown in FIG. 3B. The controller 71 includes a CPU 81 and a memory 82.

The CPU 81 as a processor executes a process according to a computer program stored in the memory 82. The process executed by the CPU 81 includes a process for making the cloud server 5 function as a cloud storage.

The above cloud storage includes a table storage and an object storage. By executing the above process by the controller 71, the first storage 73 functions as a table storage, and the second storage 74 functions as an object storage.

The exemplary first storage 73 functions as a NoSQL data store and is configured to be able to store a table whose constituent elements are a group of schemaless entities.

The exemplary second storage 74 functions as an object storage in which any text file and binary file as objects can be read and written from the outside using the HTTP/HTTPS protocol.

As a cloud service that provides the above-mentioned table storage and object storage, Microsoft Azure is known. The cloud server 5 can operate in the same manner as such a cloud service. Azure is a registered trademark of Microsoft Corporation.

(3) Processes Executed on Mobile Terminal 3

Figure 4:
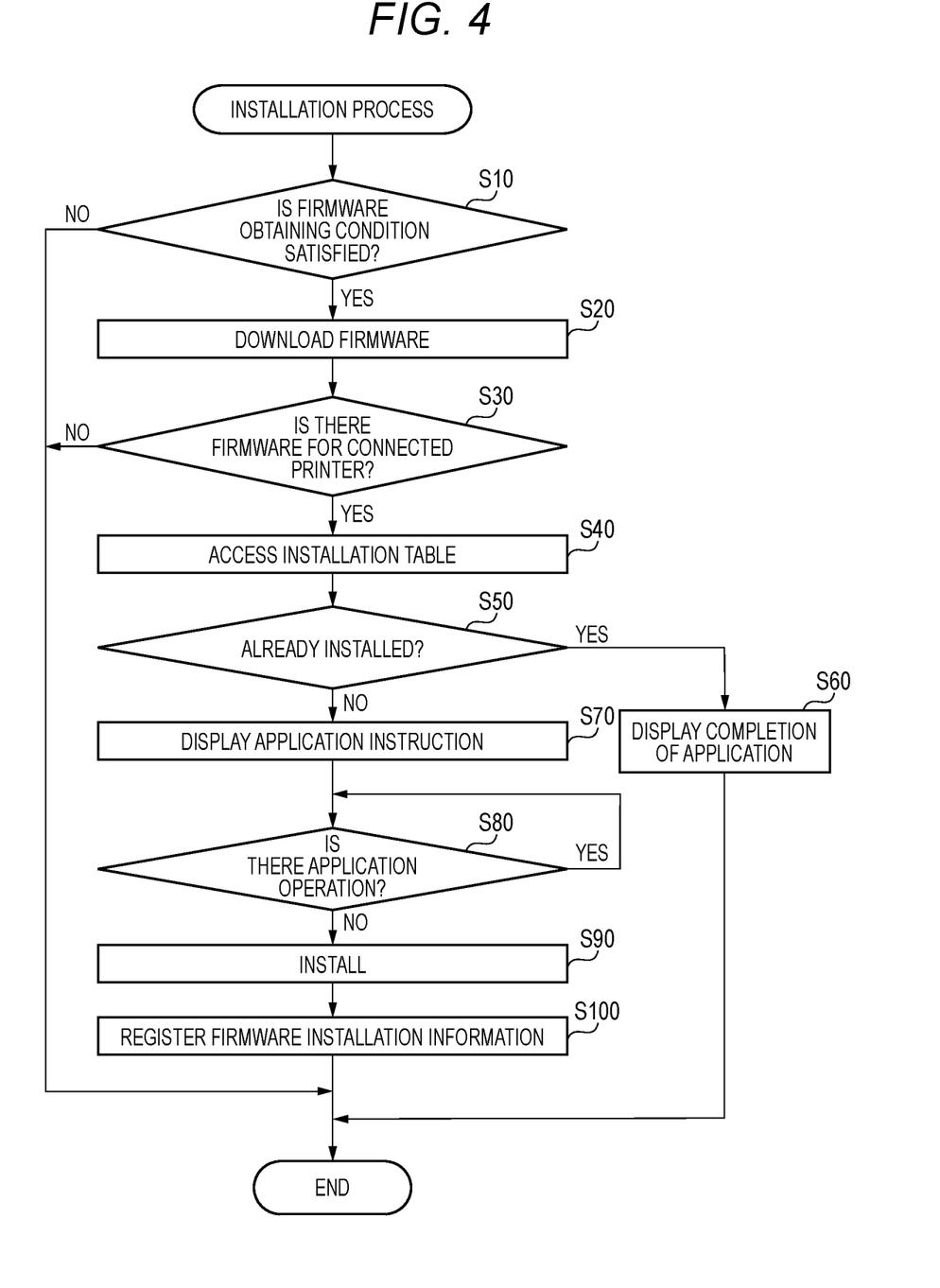
FIG. 4 is a flowchart showing an installation process of a first illustrative embodiment.

Next, a procedure of an installation process executed by the controller 31 of the mobile terminal 3 will be described. The installation process is a process that is repeatedly executed during the operation of the mobile terminal 3.

When the installation process is executed, the CPU 41 of the controller 31 first determines in S10 whether or not a preset firmware obtaining condition is satisfied, as shown in FIG. 4. The firmware obtaining condition of the present illustrative embodiment is, for example, that a preset firmware obtaining cycle elapses.

Here, when the firmware obtaining condition is not satisfied, the CPU 41 ends the installation process. On the other hand, when the firmware obtaining condition is satisfied, the CPU 41 downloads, from the second storage 74 of the cloud server 5, all the firmware that are not obtained by the mobile terminal 3 among the firmware uploaded to the second storage 74, in S20. The management device 2 uploads the firmware of all the models of the printers 4 managed by the management system 1 to the second storage 74 of the cloud server 5.

Next, in S30, the CPU 41 determines whether or not the firmware downloaded in S20 includes firmware corresponding to the model of the printer 4 connected to the mobile terminal 3 (hereinafter, referred to as a connected printer). Here, when there is no firmware corresponding to the model of the connected printer, the CPU 41 ends the installation process.

On the other hand, when there is firmware corresponding to the model of the connected printer, the CPU 41 accesses an installation table T1 of the first storage 73 of the cloud server 5 to obtain the firmware installation information of the connected printer, in S40.

Figure 5:
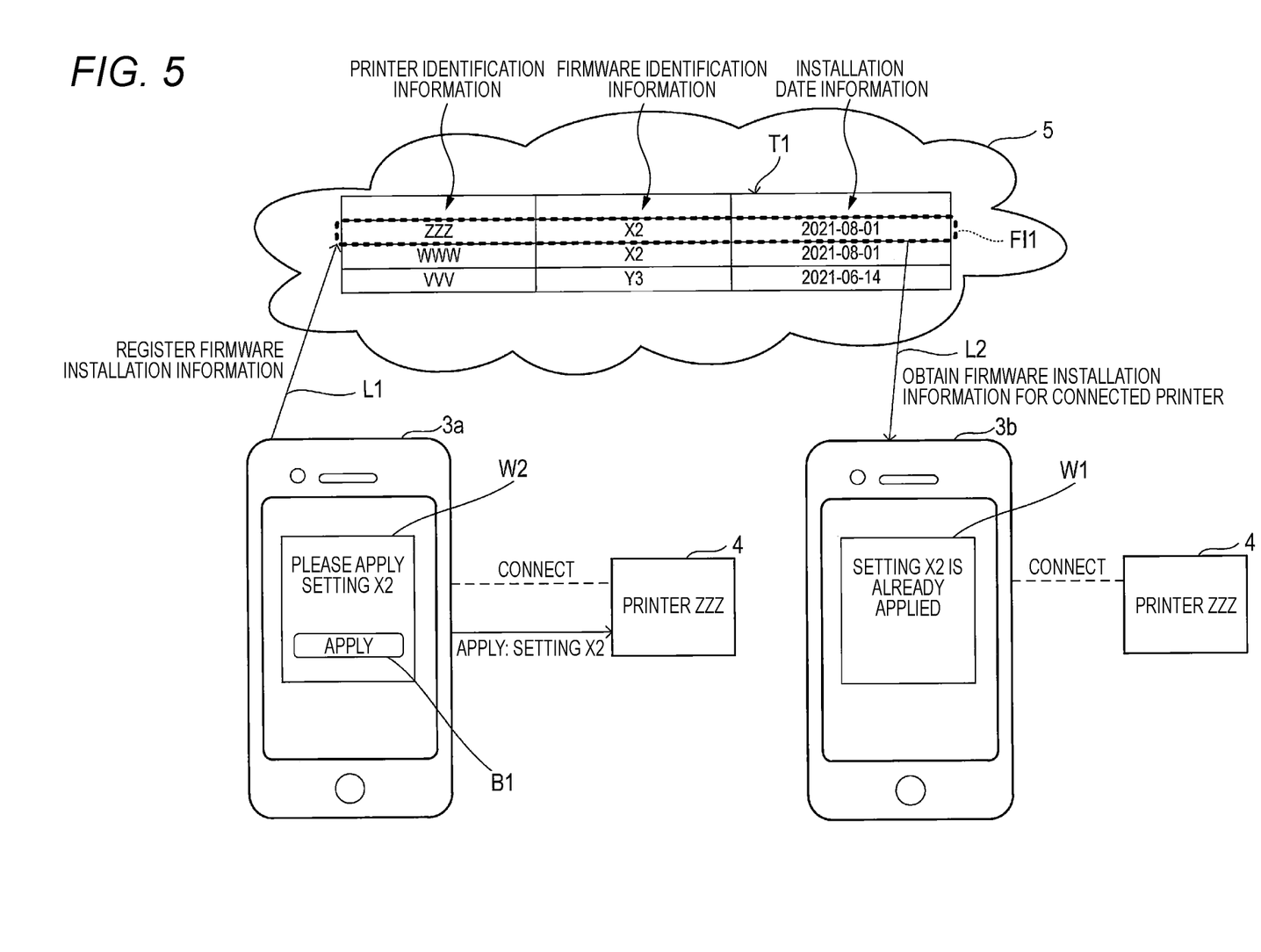
FIG. 5 is a diagram illustrating a firmware installation method.

As shown in FIG. 5, the installation table T1 stores firmware installation information for each of the plurality of printers 4 managed by the management system 1. The firmware installation information includes printer identification information that identifies the printer 4, firmware identification information, and installation date information.

The firmware identification information is information that identifies the firmware applied to the printer 4. The firmware identification information includes information indicating a model supported by the firmware and information indicating the firmware version.

The installation date information indicates the date when the firmware installation is completed. The installation date information may include the time (i.e., hours, minutes, and seconds) in addition to the date.

When the process of S40 is completed, as shown in FIG. 4, in S50, the CPU 41 determines whether or not the firmware of the connected printer (hereinafter, referred to as a corresponding firmware) among the firmware downloaded in S20 is already installed in the connected printer, based on the firmware installation information obtained in S40. Specifically, the CPU 41 determines that the corresponding firmware is already installed in the connected printer when the firmware installation information including the printer identification information matching the connected printer and the firmware identification information matching the model and version of the corresponding firmware is obtained in S40.

Here, when the corresponding firmware is already installed in the connected printer, the CPU 41 displays the completion of the application and ends the installation process, in S60. Specifically, in S60, the CPU 41 displays the applied window W1 indicating that the setting corresponding to the corresponding firmware is applied on the display screen of the display 33, as shown in FIG. 5.

On the other hand, when the corresponding firmware is not installed in the connected printer, the CPU 41 displays the application instruction as shown in FIG. 4, in S70. Specifically, in S70, the CPU 41 displays an application instruction window W2 for giving an instruction to apply the setting corresponding to the corresponding firmware on the display screen of the display 33, as shown in FIG. 5. The application instruction window W2 includes an apply button B1 that is operated when the worker gives an instruction to start the installation.

When the process of S70 is completed, the CPU 41 determines whether or not the application operation is performed, as shown in FIG. 4, in S80. Specifically, the CPU 41 determines that the application operation is performed when the input operation information indicating that the apply button B1 is operated is output from the input device 14.

Here, when the application operation is not performed, the CPU 41 waits until the application operation is performed by repeating the process of S80. Then, when the application operation is performed, the CPU 41 installs the firmware of the connected printer among the firmware downloaded in S20, in the connected printer in S90.

In S100, the CPU 41 registers the firmware installation information in the installation table T1 of the first storage 73 of the cloud server 5, and ends the installation process. When the firmware installation information including the same printer identification information as the connected printer is already registered in the installation table T1, the CPU 41 overwrites the already registered firmware installation information to register new firmware installation information. The firmware installation information registered in S100 includes printer identification information indicating the connected printer, firmware identification information indicating the model and version of the firmware installed in S90, and installation date information indicating the date when the firmware is installed in the connected printer in S90.

Here, the firmware installation when the two mobile terminals 3 are connected to the same printer 4 on different dates will be described.

As shown in FIG. 5, first, it is assumed that a mobile terminal 3a is connected to the printer 4 (hereinafter, referred to as a printer ZZZ) whose printer identification information is "ZZZ". Then, it is assumed that the mobile terminal 3a downloads the latest firmware corresponding to the model of the printer ZZZ from the cloud server 5.

In this case, since the firmware installation information of the latest firmware corresponding to the model of the printer ZZZ is not registered in the installation table T1, the mobile terminal 3a displays the application instruction window W2. When the apply button B1 of the application instruction window W2 is operated by the worker, the latest firmware corresponding to the model of the printer ZZZ is installed in the printer ZZZ. In FIG. 5, the installation of the latest firmware of the printer ZZZ is referred to as "setting X2".

When the installation is completed, the mobile terminal 3a registers the firmware installation information FI1 in the cloud server 5 as indicated by an arrow L1. In the firmware installation information FI1 of FIG. 5, the printer identification information of the printer ZZZ is described as "ZZZ", the model and version of the firmware are described as "X2", and the date when the installation is completed is described as "2021-08-01".

After that, it is assumed that a mobile terminal 3b is connected to the printer ZZZ. It is assumed that the mobile terminal 3b downloads the latest firmware corresponding to the model of the printer ZZZ from the cloud server 5.

In this case, the mobile terminal 3b accesses the installation table T1 of the first storage 73 of the cloud server 5 as indicated by an arrow L2, and obtains the firmware installation information FI1 of the connected printer. Since the firmware installation information FI1 of the latest firmware corresponding to the model of the printer ZZZ is registered in the installation table T1, the mobile terminal 3b displays the applied window W1 on the display screen of the display 33 and does not install the firmware.

Figure 6:
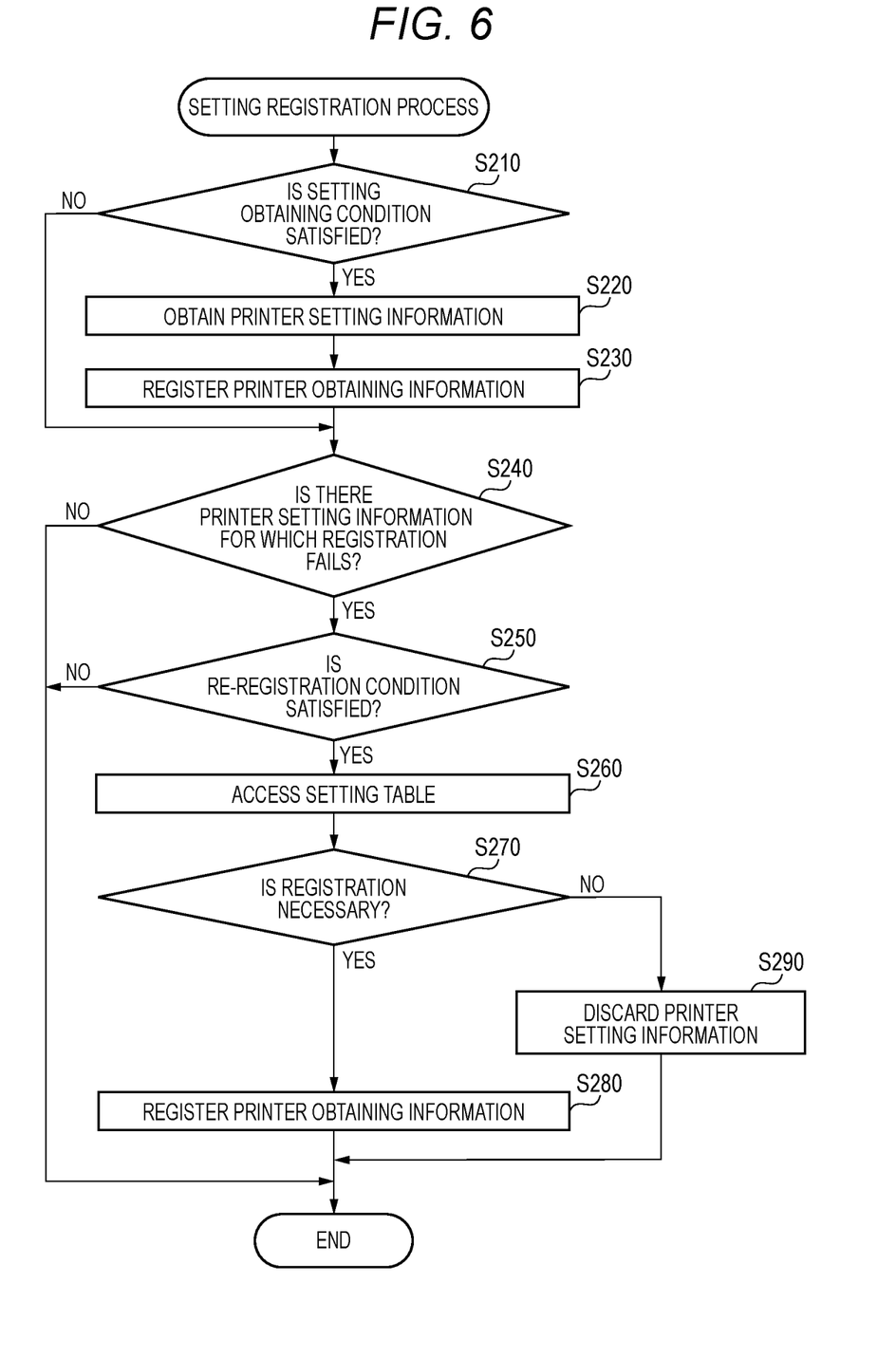
FIG. 6 is a flowchart showing a setting registration process.

Next, a procedure of a setting registration process executed by the controller 31 of the mobile terminal 3 will be described. The setting registration process is a process that is repeatedly executed during the operation of the mobile terminal 3.

When the setting registration process is executed, the CPU 41 of the controller 31 first determines whether or not the preset setting obtaining condition is satisfied, in S210, as shown in FIG. 6. The setting obtaining condition of the present illustrative embodiment is, for example, that a preset setting obtaining cycle elapses.

Here, when the setting obtaining cycle is not satisfied, the CPU 41 shifts to S240. On the other hand, when the setting obtaining cycle is satisfied, the CPU 41 obtains printer setting information from the connected printer, in S220. The printer setting information is information related to the setting of the connected printer, and includes, for example, the number of prints, the firmware version, and the like.

Figure 7:
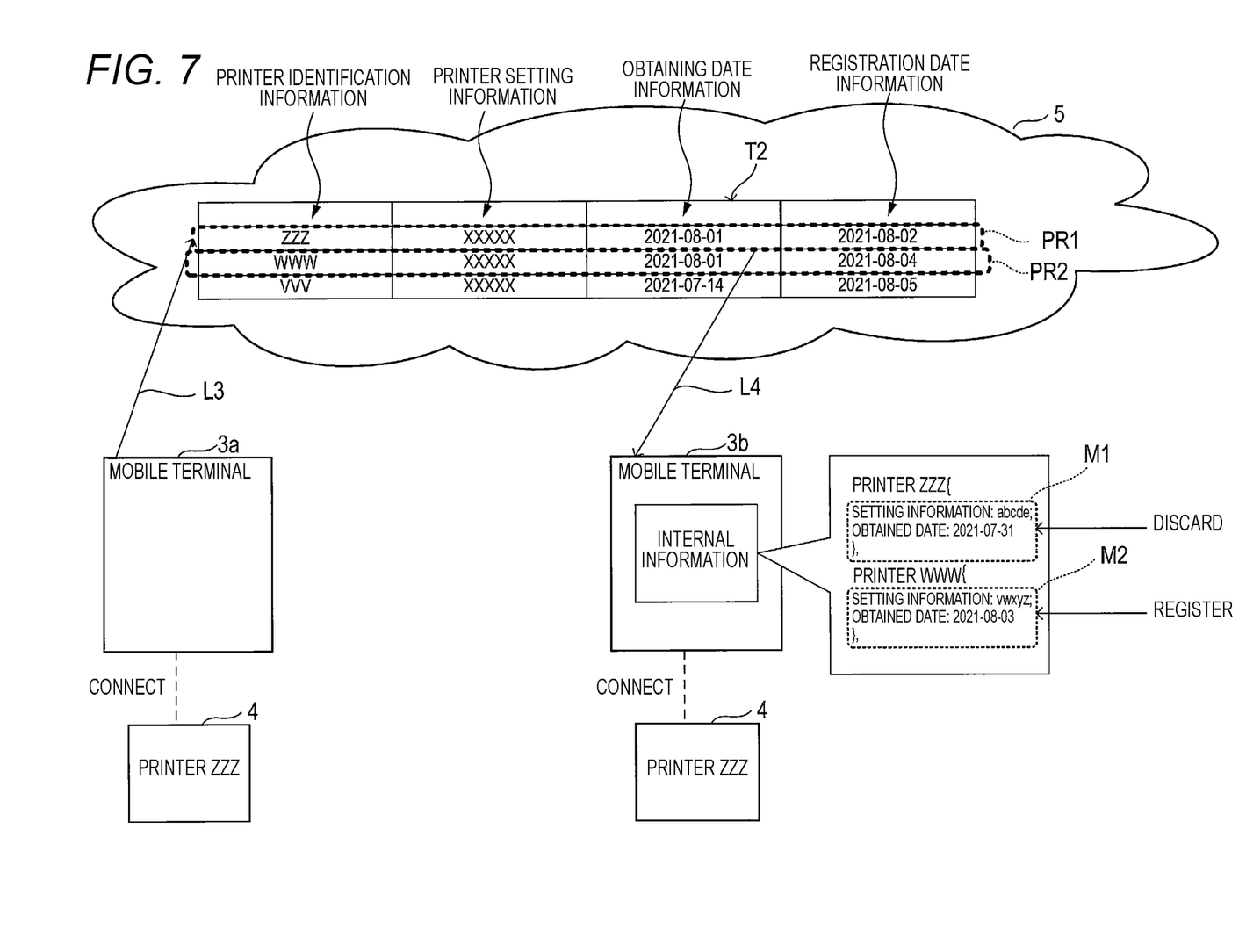
FIG. 7 is a diagram illustrating the registration and destruction of printer setting information.

In S230, the CPU 41 registers printer obtaining information in a setting table T2 of the first storage 73 of the cloud server 5, and shifts to S240. When the printer obtaining information including the same printer identification information as the connected printer is already registered in the setting table T2, the CPU 41 overwrites the already registered printer obtaining information to register new printer obtaining information. As shown in FIG. 7, the setting table T2 stores printer obtaining information for each of the plurality of printers 4 managed by the management system 1. The printer obtaining information includes printer identification information, printer setting information, obtaining date information, and registration date information.

The obtaining date information indicates the date when the printer setting information is obtained from the connected printer. The registration date information indicates the date when the printer obtaining information is registered in the setting table T2. The obtaining date information and the registration date information may include the time in addition to the date.

After shifting to S240, the CPU 41 determines whether or not there is printer setting information for which registration fails, as shown in FIG. 6. Here, when there is no printer setting information for which registration fails, the CPU 41 ends the setting registration process.

On the other hand, when there is printer setting information for which registration fails, the CPU 41 determines whether or not a preset re-registration condition is satisfied, in S250. The re-registration condition of the present illustrative embodiment is, for example, that a preset re-registration cycle elapses.

Here, when the re-registration condition is not satisfied, the CPU 41 ends the setting registration process. On the other hand, when the re-registration condition is satisfied, the CPU 41 accesses the setting table T2 of the first storage 73 of the cloud server 5 to obtain the printer obtaining information of the connected printer, in S260.

In S270, the CPU 41 determines whether or not it is necessary to register the printer setting information for which registration fails. Specifically, when the obtaining date indicated by the obtaining date information of the printer obtaining information obtained in S260 is earlier than the obtaining date when the printer setting information for which registration fails is obtained, the CPU 41 determines that the printer setting information for which registration fails needs to be registered.

Here, when it is necessary to register the printer setting information for which registration fails, the CPU 41 registers the printer obtaining information including the printer setting information for which registration fails, in the setting table T2 of the first storage 73 of the cloud server 5 and ends the setting registration process, in S280.

On the other hand, when it is not necessary to register the printer setting information for which registration fails, the CPU 41 discards the printer setting information for which registration fails and ends the setting registration process, in S290.

Here, registration of printer obtaining information when two mobile terminals 3 are connected to the same printer 4 on different dates will be described.

As shown in FIG. 7, first, it is assumed that the mobile terminal 3*b* is connected to the printer ZZZ on Jul. 31, 2021. It is assumed that the mobile terminal 3*b* obtains the printer setting information from the printer ZZZ. It is assumed that the mobile terminal 3*b* tries to register the printer obtaining information including the obtained printer setting information in the cloud server 5, and the registration fails due to network trouble or the like. Therefore, the mobile terminal 3*b* temporarily stores the printer setting information obtained from the printer ZZZ in the storage device 35 of the mobile terminal 3*b* together with the obtaining date information.

Internal storage information M1 of FIG. 7 includes the printer setting information obtained from the printer ZZZ and the obtaining date information. In the internal storage information M1 of FIG. 7, the printer setting information obtained from the printer ZZZ by the mobile terminal 3*b* is described as "abcde", and the obtaining date is described as "2021-07-31".

After that, it is assumed that the mobile terminal 3*a* is connected to the printer ZZZ on Aug. 1, 2021. It is assumed that the mobile terminal 3*a* obtains the printer setting information from the printer ZZ. It is assumed that the mobile terminal 3*a* tries to register the printer obtaining information including the obtained printer setting information in the cloud server 5, and the registration fails due to network trouble or the like.

Then, on Aug. 2, 2021, as shown by an arrow L3, it is assumed that the mobile terminal 3*a* registers the printer obtaining information PR1 including the printer setting information obtained from the printer ZZZ in the cloud server 5, in the setting table T2 of the first storage 73 of the cloud server 5.

On Aug. 3, 2021, when the mobile terminal 3*b* re-registers the printer obtaining information including the printer setting information obtained from the printer ZZZ in the cloud server 5, based on the internal storage information M1, the mobile terminal 3*b* accesses the setting table T2 of the cloud server 5 to obtain the printer obtaining information PR1 as shown by an arrow L4.

Here, since the obtaining date indicated by the obtaining date information of the printer obtaining information PR1 is later than the obtaining date of the internal storage information M1, the mobile terminal 3*b* discards the internal storage information M1.

It is assumed that the mobile terminal 3*b* temporarily stores internal storage information M2 of the printer 4 (hereinafter, referred to as a printer WWW) whose printer identification information is "WWW" in the storage device 35 of the mobile terminal 3*b*. In the internal storage information M2, the printer setting information obtained from the printer WWW is described as "vwxyz", and the obtaining date is described as "2021-08-03".

The mobile terminal 3*b* obtains the printer obtaining information PR2 of the printer WWW when the mobile terminal 3*b* re-registers the printer obtaining information of the printer WWW in the cloud server 5 based on the internal storage information M2.

Here, in the mobile terminal 3*b*, since the obtaining date indicated by the obtaining date information of the printer obtaining information PR2 is earlier than the obtaining date of the internal storage information M2, the printer obtaining information based on the internal storage information M2 is stored in the setting table T2 of the cloud server 5.

Figure 8A:
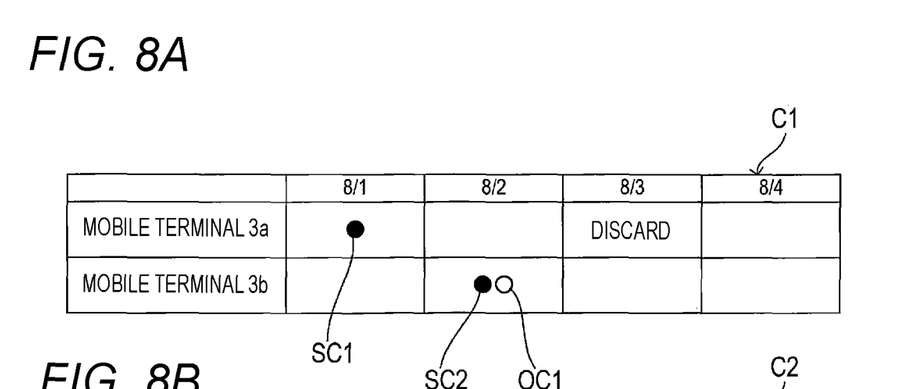
FIGS. 8A and 8B are charts showing two cases of registration of printer obtaining information.
Figure 8B:
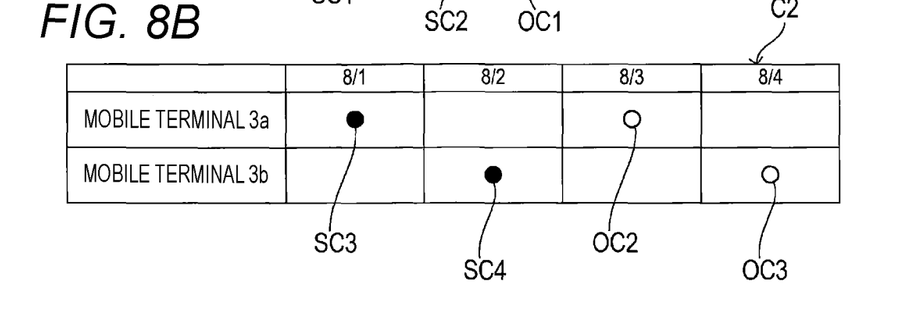

Next, two cases of registration of printer obtaining information when two mobile terminals 3a and 3b are connected to the printer ZZZ on different dates will be described.

As shown in Chart C1 of FIG. 8A, the mobile terminal 3a is connected to the printer ZZZ on August 1 and obtains printer setting information from the printer ZZZ. However, the mobile terminal 3a fails to register the printer obtaining information in the setting table T2 of the cloud server 5. The filled circles SC1 and SC2 in Chart C1 indicate that the printer setting information is obtained but it fails to register the printer obtaining information in the cloud server 5.

The mobile terminal 3b is connected to the printer ZZZ on August 2 and obtains the printer setting information from the printer ZZZ. However, the mobile terminal 3b fails to register the printer obtaining information in the setting table T2 of the cloud server 5.

After that, the mobile terminal 3b re-registers the printer obtaining information in the cloud server 5 on the same day. The white circle OC1 in Chart C1 indicates that the printer obtaining information is registered in the cloud server 5.

When the mobile terminal 3a re-registers the printer obtaining information in the cloud server 5 on August 3, since the obtaining date of the printer obtaining information registered in the cloud server 5 is later than the obtaining date when the mobile terminal 3a obtains the printer setting information from the printer ZZZ, the printer setting information obtained from the printer ZZZ is discarded.

As shown in Chart C2 of FIG. 8B, the mobile terminal 3a is connected to the printer ZZZ on August 1 and obtains the printer setting information from the printer ZZZ. However, the mobile terminal 3a fails to register the printer obtaining information in the setting table T2 of the cloud server 5. The filled circles SC3 and SC4 in Chart C2 indicate that the printer setting information is obtained but it fails to register the printer obtaining information in the cloud server 5.

The mobile terminal 3b is connected to the printer ZZZ on August 2 and obtains the printer setting information from the printer ZZZ. However, the mobile terminal 3b fails to register the printer obtaining information in the setting table T2 of the cloud server 5.

On August 3, the mobile terminal 3a re-registers the printer obtaining information in the cloud server 5. The white circles OC2 and OC3 in Chart C2 indicate that the printer obtaining information is registered in the cloud server 5.

When the mobile terminal 3b re-registers the printer obtaining information in the cloud server 5 on August 4, since the obtaining date of the printer obtaining information registered in the cloud server 5 is earlier than the obtaining date when the mobile terminal 3b obtains the printer setting information from the printer ZZZ, the printer obtaining information is re-registered in the cloud server 5.

(4) Effect

The management program 35a configured in this way is used in the management system 1 that manages the plurality of printers 4 and is configured to cause the controller 31 included in the mobile terminal 3 to execute the application registration process.

The management system 1 includes the management device 2 that manages the plurality of printers 4, a plurality of mobile terminals 3 configured to be capable of data communication with the plurality of printers 4, and the cloud server 5 configured to be capable of data communication with the management device 2 and the plurality of mobile terminals 3.

In the application registration process, the firmware installation information is registered in the cloud server 5. The firmware installation information includes printer identification information that identifies the connected printer which is a printer 4 that is connected to the mobile terminal 3 so that data communication is possible, firmware identification information that identifies the firmware applied to the printer 4, and installation date information that indicates the installation date when the firmware is installed in the connected printer.

In the application registration process, the printer obtaining information is registered in the cloud server 5. The printer obtaining information includes the printer identification information, the printer setting information, and the obtaining date information. The printer setting information is information related to the setting of the connected printer. The obtaining date information indicates the obtaining date when the settings applied to the connected printer are obtained.

Such a management program 35a can reduce the occurrence of a situation in which the firmware installation information of the installation date earlier than the date indicated by the installation date information is unnecessarily registered in the cloud server 5, based on the installation date information included in the firmware installation information already registered in the cloud server 5, and can reduce the amount of data communication between the cloud server 5 and the mobile terminal 3.

The management program 35a can reduce the occurrence of a situation in which the printer obtaining information of the obtaining date earlier than the date indicated by the obtaining date information is unnecessarily registered in the cloud server 5, based on the obtaining date information already included in the printer obtaining information already registered in the cloud server 5, and can reduce the amount of data communication between the cloud server 5 and the mobile terminal 3.

The printer obtaining information further includes registration date information indicating a registration date, which is a date for registering the printer obtaining information in the cloud server 5. As a result, the management program 35a allows the management device 2 and the plurality of mobile terminals 3 to check the registration date of the printer obtaining information.

The management program 35a is configured to cause the controller 31 to further execute the re-execution process and the execution prohibition process.

The re-execution process re-executes the application registration process when the printer obtaining information is not able to be registered in the cloud server 5 in the application registration process.

In the execution prohibition process, when the printer obtaining information corresponding to the connected printer is obtained from the cloud server 5 before the re-execution process is executed, and the obtaining date indicated by the obtaining date information included in the obtained cloud server 5 is later than the obtaining date indicated by the obtaining date information included in the obtaining date information to be registered in the application registration process, the execution of the re-execution process is prohibited.

Such a management program 35a can reduce the occurrence of a situation in which the printer obtaining information of the obtaining date earlier than the date indicated by the obtaining date information is unnecessarily registered in the cloud server 5, based on the obtaining date information included in the printer obtaining information already registered in the cloud server 5, and can reduce the amount of data communication between the cloud server 5 and the mobile terminal 3.

In the illustrative embodiment described above, the printer 4 corresponds to the terminal device, the mobile terminal 3 corresponds to the information processing device, and the cloud server 5 corresponds to the storage device.

The printer identification information corresponds to device identification information, the firmware identification information and the printer setting information correspond to device setting information, the installation date information and the obtaining date information correspond to application date information, and the firmware installation information and the printer obtaining information correspond to device registration information.

S100 and S230 correspond to the application registration process, S280 corresponds to the re-execution process, and S260 and S270 correspond to the execution prohibition process.

Second Illustrative Embodiment

A second illustrative embodiment of the present disclosure will be described below together with the drawings. In the second illustrative embodiment, a part different from the first illustrative embodiment will be described. The same reference numerals are given to common configurations.

The management system 1 of the second illustrative embodiment is different from the first illustrative embodiment in that the installation process is changed.

Figure 9:
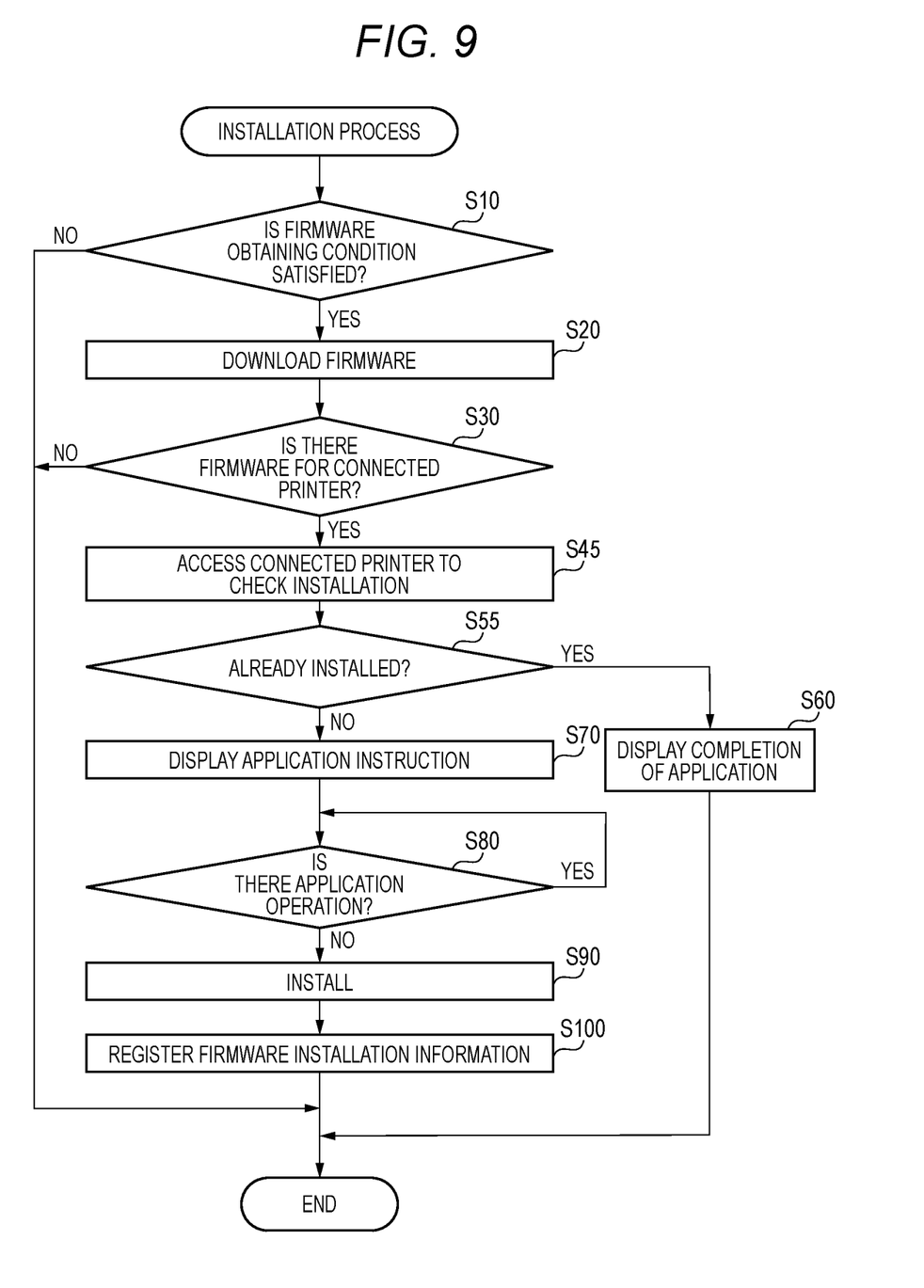
FIG. 9 is a flowchart showing an installation process of a second illustrative embodiment.

As shown in FIG. 9, the installation process of the second illustrative embodiment is different from the first illustrative embodiment in that the processes of S40 and S50 are omitted and the processes of S45 and S55 are added.

That is, when there is firmware corresponding to the model of the connected printer in S30, the CPU 41 accesses the connected printer and checks whether or not the corresponding firmware is already installed in the connected printer, in S45.

In S55, the CPU 41 determines whether or not the corresponding firmware is already installed in the connected printer, based on the check result in S45. Here, when the corresponding firmware is already installed, the CPU 41 shifts to S60. On the other hand, when the corresponding firmware is not installed, the CPU 41 shifts to S70.

When changing the printer settings of the plurality of printers 4, the management device 2 of the management system 1 configured in this way is configured to upload the firmware indicating the changed printer settings to the cloud server 5.

When the firmware is downloaded from the cloud server 5, the mobile terminal 3 is configured to execute a setting change process for changing the printer settings of the connected printer, based on the firmware.

The management program 35a is configured to cause the controller 31 to further execute the setting confirmation process and the change prohibition process.

The setting confirmation process determines whether or not the printer settings corresponding to the firmware downloaded from the cloud server 5 are applied to the connected printer by performing data communication with the connected printer.

The change prohibition process prohibits the execution of the setting change process when it is determined in the setting confirmation process that the printer settings corresponding to the downloaded firmware are applied to the connected printer.

Such a management program 35a can reduce the occurrence of a situation in which the setting change process is unnecessarily executed and can reduce the processing load of the mobile terminal 3.

In the illustrative embodiment described above, the firmware corresponds to the setting change information, S90 corresponds to the setting change process, S45 corresponds to the setting confirmation process, and S60 corresponds to the change prohibition process.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the above illustrative embodiment, the terminal device of the present disclosure is the printer 4. However, the terminal device of the present disclosure may be a device that is connected to the end of a network and has a function of communicating with another device, for example, a multifunction peripheral having a scanner function of reading an image from a document, a copy machine, and a facsimile.

A plurality of functions possessed by one component in the above illustrative embodiment may be implemented by a plurality of components, or one function possessed by one component may be implemented by the plurality of components. Further, the plurality of functions possessed by the plurality of components may be implemented by one component, or one function implemented by the plurality of components may be implemented by one component. Further, a part of the configuration of the above illustrative embodiment may be omitted. In addition, at least a part of the configuration of the above illustrative embodiment may be added or replaced with the configuration of the other above illustrative embodiment.

In addition to the mobile terminal 3 described above, the present disclosure can also be implemented in various forms such as a system having the mobile terminal 3 as a component, a program for operating a computer as the mobile terminal 3, a non-transitional substantive recording medium such as a semiconductor memory in which the program is recorded, the management method, and the like.

What is claimed is:

1. A non-transitory computer-readable medium storing a management program used in a management system managing a plurality of terminal devices, the management system comprising a management device configured to manage the plurality of terminal devices, a plurality of information processing devices configured to perform data communication with the plurality of terminal devices, and a storage device configured to perform data communication with the management device and the plurality of information processing devices, the management device including at least one processor,
the plurality of information processing devices each including at least one computer, and the storage device including at least one further processor with associated memory;

the management program, when executed by a computer of an information processing device, of the plurality of information processing devices, causes the information processing device to perform:

registering device registration information in the storage device, the device registration information including:

device identification information identifying a connected terminal device that is the terminal device communicably connected to the information processing device such that the data communication is possible;

device setting information related to device setting of the connected terminal device; and application date information indicating an application date when the device setting is applied to the connected terminal device;

wherein in a case of changing the device settings of the plurality of terminal devices, the management device is configured to upload setting change information indicating the changed device settings to the storage device, wherein the information processing device is configured to:

download the setting change information from the storage device; and change the device settings of the connected terminal device based on the downloaded setting change information, and wherein the management program, when executed by the computer, further causes the information processing device to perform:

determining whether the device settings corresponding to the downloaded setting change information are applied to the connected terminal device by performing the data communication with the connected terminal device; and in a case it is determined that the device settings corresponding to the downloaded setting change information are applied to the connected terminal device, prohibiting the changing of the device settings.

2. The non-transitory computer-readable medium according to claim 1, wherein the device registration information further includes registration date information indicating a registration date for registering the device registration information in the storage device.

3. A non-transitory computer-readable medium storing a management program used in a management system managing a plurality of terminal devices, the management system comprising a management device configured to manage the plurality of terminal devices, a plurality of information processing devices configured to perform data communication with the plurality of terminal devices, and a storage device configured to perform data communication with the management device and the plurality of information processing devices, the management device including at least one processor, the plurality of information processing devices each including at least one computer, and the storage device including at least one further processor with associated memory;

the management program, when executed by a computer of an information processing device, of the plurality of information processing devices, causes the information processing device to perform:

registering device registration information in the storage device, the device registration information including:

device identification information identifying a connected terminal device that is the terminal device communicably connected to the information processing device such that the data communication is possible;

device setting information related to device setting of the connected terminal device; and application date information indicating an application date when the device setting is applied to the connected terminal device; and wherein the management program, when executed by the computer, further causes the information processing device to perform:

re-registering the device registration information; and before performing the re-registering of the device registration information, obtaining the device registration information corresponding to the connected terminal device from the storage device; and in a case the application date indicated by the application date information included in the obtained device registration information is later than the application date indicated by the application date information included in the device registration information to be registered, prohibiting the performing of the re-registering of the device registration information.

4. An information processing device used in a management system that manages a plurality of terminal devices, the management system comprising a management device configured to manage the plurality of terminal devices, a plurality of the information processing devices configured to perform data communication with the plurality of terminal devices, and a storage device configured to perform data communication with the management device and the plurality of information processing devices, the management device including at least one processor, the plurality of information processing devices each including at least one computer, and the storage device including at least one further processor with associated memory;

an information processing device, of plurality of the information processing devices, comprising:

a controller configured to:

register device registration information in the storage device, the device registration information including:

device identification information identifying a connected terminal device that is the terminal device communicably connected to the information processing device such that the data communication is possible;

device setting information related to the device setting of the connected terminal device; and application date information indicating an application date when the device setting is applied to the connected terminal device;

wherein the controller is further configured to:

re-register the device registration information; and before the re-registering of the device registration information, obtain the device registration information corresponding to the connected terminal device from the storage device; and in a case the application date indicated by the application date information included in the obtained device registration information is later than the application date indicated by the application date information included in the device registration information to be registered, prohibit the re-registering of the device registration information.

5. The information processing device according to claim 4, wherein the device registration information further includes registration date information indicating a registration date for registering the device registration information in the storage device.

6. The information processing device according to claim 4,
wherein in a case of changing the device settings of the plurality of terminal devices, the management device is configured to upload setting change information indicating the changed device settings to the storage device, and
wherein the controller is further configured to:
download the setting change information from the storage device;
change the device settings of the connected terminal device based on the downloaded setting change information;
determine whether the device settings corresponding to the downloaded setting change information are applied to the connected terminal device by performing the data communication with the connected terminal device; and
in a case it is determined that the device settings corresponding to the downloaded setting change information are applied to the connected terminal device, prohibit the changing of the device settings.

7. A management method executed by an information processing device in a management system managing a plurality of terminal devices, the management system comprising a management device configured to manage the plurality of terminal devices, a plurality of the information processing devices configured to perform data communication with the plurality of terminal devices, and a storage device configured to perform data communication with the management device and the plurality of information processing devices,
the management device including at least one processor, the plurality of information processing devices each including at least one computer, and the storage device including at least one further processor with associated memory;
the management method comprising:
registering device registration information in the storage device, the device registration information including:
device identification information identifying a connected terminal device that is the terminal device communicably connected to an information processing device, of the plurality of the information processing devices, such that the data communication is possible;
device setting information related to the device setting of the connected terminal device; and
application date information indicating an application date when the device setting is applied to the connected terminal device to be registered in the storage device;
wherein the method further comprises:
re-registering the device registration information; and
before performing the re-registering of the device registration information,
obtaining the device registration information corresponding to the connected terminal device from the storage device; and
in a case the application date indicated by the application date information included in the obtained device registration information is later than the application date indicated by the application date information included in the device registration information to be registered, prohibiting the performing of the re-registering of the device registration information.

8. The management method according to claim 7, wherein the device registration information further includes registration date information indicating a registration date for registering the device registration information in the storage device.

9. The management method according to claim 7,
wherein in a case of changing the device settings of the plurality of terminal devices, the management device is configured to upload setting change information indicating the changed device settings to the storage device,
wherein the method further comprises:
downloading the setting change information from the storage device;
changing the device settings of the connected terminal device based on the downloaded setting change information;
determining whether the device settings corresponding to the downloaded setting change information are applied to the connected terminal device by performing the data communication with the connected terminal device; and
in a case it is determined that the device settings corresponding to the downloaded setting change information are applied to the connected terminal device, prohibiting the changing of the device settings.

* * * * *